United States Patent [19]
Reese et al.

[11] Patent Number: 5,832,125
[45] Date of Patent: *Nov. 3, 1998

[54] BIT RATE CONTROL USING SHORT-TERM AND LONG-TERM PERFORMANCE CHARACTERIZATION

[75] Inventors: Robert J. Reese, Lake Oswego; George K. Chen, Portland, both of Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 568,748

[22] Filed: Dec. 7, 1995

[51] Int. Cl.$^6$ .............................. G06K 9/36; H04N 7/12
[52] U.S. Cl. ...................... 382/239; 348/416; 348/415
[58] Field of Search ............................ 382/239, 232, 382/233, 236, 251; 348/419, 405, 403, 404, 416, 699, 415

[56] References Cited

U.S. PATENT DOCUMENTS

| | | | |
|---|---|---|---|
| 4,893,123 | 1/1990 | Boisson | 348/419 |
| 4,933,761 | 6/1990 | Murakami et al. | 348/422 |
| 5,046,071 | 9/1991 | Tanoi | 348/415 |
| 5,097,330 | 3/1992 | Guichard et al. | 348/399 |
| 5,122,877 | 6/1992 | Keesmen | 3648/421 |
| 5,134,476 | 7/1992 | Aravind et al. | 348/415 |
| 5,150,209 | 9/1992 | Baker et al. | 348/407 |
| 5,317,397 | 5/1994 | Odaka et al. | 348/416 |
| 5,333,012 | 7/1994 | Singhal et al. | 382/232 |
| 5,351,085 | 9/1994 | Coelho et al. | 348/391 |
| 5,367,629 | 11/1994 | Chu et al. | 382/253 |
| 5,509,089 | 4/1996 | Ghoshal | 382/236 |

OTHER PUBLICATIONS

Kronanader, "Post– and Pre–Processing in Coding of Image Sequence Using Filters with Motion Compensated History" 1988 Int. Conf. Acoustics, Speech. Sig. Processing, vol. 2, Apr. 1988, pp. 1104–1107.

*Primary Examiner*—David K. Moore
*Assistant Examiner*—Wenpeng Chen
*Attorney, Agent, or Firm*—William H. Murray, Esq.; N. Stephen Kinsella, Esq.

[57] ABSTRACT

The performance of video encoding is characterized both over the short term (e.g., based on the previous encoded frame) and over the long term (e.g., based on the previous n encoded frames). An encoding parameter (e.g., the global quantization level) is selected for the current frame based on the short-term and long-term performance characterizations and the current frame is encoded using that selected encoding parameter. In a preferred embodiment, the global quantization (Q) level is permitted to change for only certain (i.e., adjustable) frames. In addition, the global Q level for key frames is generated using special processing which tends to allow the key frames to be encoded using more bits.

24 Claims, 2 Drawing Sheets

BIT RATE CONTROL USING SHORT-TERM AND LONG-TERM PERFORMANCE CHARACTERIZATION

CROSS-REFERENCES TO RELATED APPLICATIONS

This application is related to U.S. Pat. No. 5,646,618 issued July 8, 1997, the teachings of which are incorporated herein by reference.

BACKGROUND OF THE INVENTION

1. Field of the Invention

The present invention relates to video compression schemes.

2. Description of the Related Art

Many conventional video compression schemes rely on the selection of certain encoding parameters to control the size of the encoded data. For example, in certain block transform-based encoding schemes, a transform, such as a discrete cosine transform or a slant transform, is applied either to blocks of pixels (for intra-frame encoding) or to blocks of pixel differences (for inter-frame encoding). The resulting transform coefficients are then quantized for subsequent run-length encoding and variable-length encoding.

The degree to which the transform coefficients are quantized (i.e., the quantization level) dictates the lengths of runs of coefficients that quantize to zero. This in turn dictates the number of bits used to variable-length encode the run-length data. By adjusting the quantization level, the size of the encoded video data can be affected. In general, higher quantization levels (i.e., coarser quantization) imply fewer bits to encode. Higher quantization levels also typically imply lower video quality. As such, a goal of typical quantization-based video encoding schemes is to use as fine a quantization level as possible to achieve as high a video quality as possible without exceeding available transmission bandwidth and/or data storage capacities.

In off-line video encoders, one typical goal is to achieve as uniform a bit rate as possible. Under these off-line encoding schemes, a target bit rate or target encoded frame size is specified. A bit rate controller of the video encoder adjusts the quantization level for each frame based on the performance of the video encoder in encoding the previous frame, to attempt to achieve the target encoded frame size for the current frame. If the previous encoded frame is too large, as compared to the target encoded frame size, then the quantization level is increased for the current frame to achieve coarser quantization to reduce the number of bits used to encode the current frame. Conversely, if the previous encoded frame is too small, then the quantization level is decreased for the current frame to permit the current frame to be encoded using more bits.

When quantization level is substantially changed from one frame to another to achieve a uniform bit rate (equal to the target encoded frame size), disturbing artifacts in the decoded video stream can result from the drastic change in video quality over a short period of time. These artifacts may be particularly pronounced with the occurrence of key frames. Key frames are frames that are encoded using only intraframe encoding techniques. For a given quantization level, key frames typically encode to a much larger size than other frames that are encoded using interframe encoding techniques (i.e., predicted frames). In order to achieve the target encoded frame size for a key frame, the quantization level may be drastically increased. The result is a key frame with substantially lower quality than the preceding predicted frames. The lower quality of the key frame can cause additional encoding problems because the key frame is the frame upon which subsequent predicted frames are ultimately based. This may cause the frames following a key frame to encode to a larger size resulting in even further degradation in video quality due to steadily increasing quantization level. As the prediction gets better and better between frames, the quantization level will slowly drop thereby increasing video quality, that is, until the next key frame.

Some off-line video encoders allow each frame to be encoded two or more times to achieve the target encoded frame size. Such bit rate controllers are not designed for real-time video encoders which may not have time to encode each frame more than once. Real-time video encoders may not have it as a goal to achieve a uniform bit rate. Rather, a real-time video encoder may have a goal of encoding a particular video sequence for storage within a specified amount of memory. This may be viewed as a goal of achieving a particular average encoded frame size, however, the size of encoded frames may be allowed to fluctuate greatly from frame to frame.

What is needed is a bit rate controller for controlling encoding parameters, such as quantization level, for real-time video encoders.

It is accordingly an object of this invention to overcome the disadvantages and drawbacks of the known art and to provide an efficient bit rate controller for real-time video encoders.

Further objects and advantages of this invention will become apparent from the detailed description of a preferred embodiment which follows.

SUMMARY OF THE INVENTION

The present invention comprises a computer-implemented process, an apparatus, and a storage medium encoded with machine-readable computer program code for encoding video signals. According to a preferred embodiment, after a plurality of previous frames in a video sequence are encoded, the short-term performance and the long-term performance of the encoding of the previous frames are characterized, wherein the characterization of the long-term performance considers effects of encoding more of the previous frames than the characterization of the short-term performance. An encoding parameter is generated for a current frame i in the video sequence based on the characterizations of the short-term and the long-term performances, and the current frame is encoded based on the selected encoding parameter.

BRIEF DESCRIPTION OF THE DRAWINGS

Other objects, features, and advantages of the present invention will become more fully apparent from the following detailed description of the preferred embodiment, the appended claims, and the accompanying drawings in which:

DESCRIPTION OF THE PREFERRED EMBODIMENT(S)

The hardware and software architectures for video encoding and decoding systems, according to preferred embodiments of the present invention, are described in detail in the '1022 application, the teachings of which are incorporated herein by reference. The present invention is directed to the bit rate controller for a real-time video encoder. The bit rate controller adjusts the global quantization (Q) level used to encode the video frames to adjust the size of the encoded frames. The adjustments to the global Q levels are based on both short-term characterizations of the performance of the video encoder and long-term characterizations of that performance.

By basing Q-level adjustments on both short-term and long-term characteristics of the performance of the video encoder, the bit rate controller of the present invention is able to achieve efficient video encoding in real time for storage to, for example, a hard drive, during video capture. The bit rate controller provides gradual adjustments to the Q level thereby allowing the encoded frame size to vary significantly from frame to frame, if necessary. This will result in a decoded video stream having a more uniform video quality, since Q level does not change drastically over short periods of time. In addition, the bit rate controller does not require a given frame to be encoded more than once, thereby making it suitable of real-time encoding in which there will typically be insufficient time to encode each frame more than once. Furthermore, because, in a preferred embodiment, the bit rate controller of the present invention is parameter driven, it is highly configurable to allow fine tuning of its operation.

Figure 1:
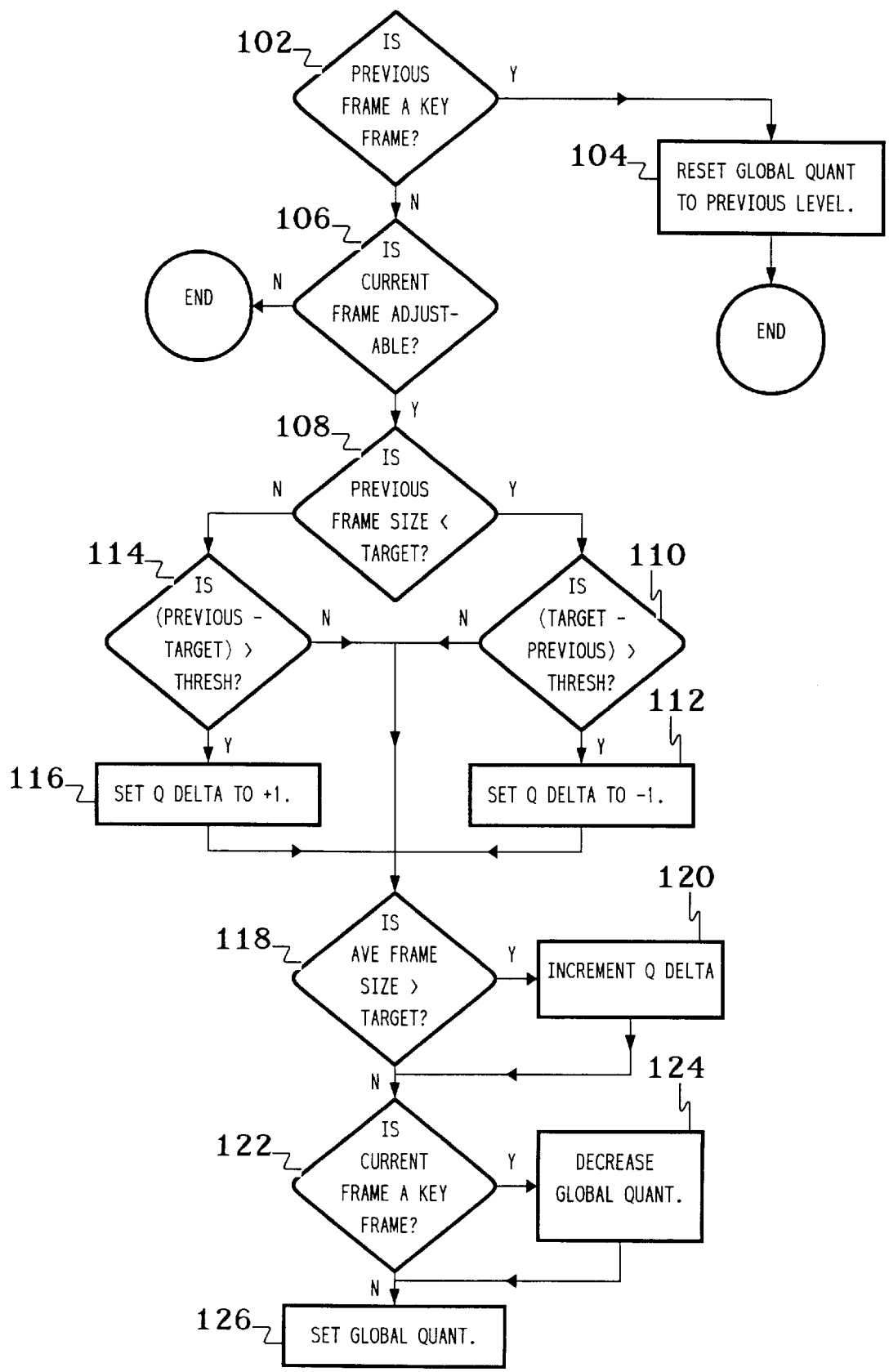
FIG. 1 is a flow diagram of the processing of a bit rate controller, according to a preferred embodiment of the present invention.

Referring now to FIG. 1, there is shown a flow diagram of the processing of a bit rate controller, according to a preferred embodiment of the present invention. The bit rate controller of FIG. 1 analyzes the performance of the video encoder in encoding the previous video frame i-1 relative to prior encoded video frames to determine how to adjust the global quantization level for the current video frame i. The video encoder uses the global Q level to determine how to quantize the different blocks of transform coefficients of a frame generated by applying a block transform to the blocks of pixels and/or pixel differences of the frame. The global Q level is the average or effective quantization level for the frame. The video encoder is allowed, however, to vary the block-level quantization level from block to block within a frame.

In particular, for a current frame i, if the previous frame i-1 is a key frame (step 102 of FIG. 1), then the global Q level is reset to the value of the global Q level that was used for the second previous frame i-2 (step 104). As explained below with respect to steps 122 and 124, in a preferred embodiment of the present invention, the selection of global Q level for key frames is different from other types of frames. In order to avoid that difference from affecting the selection of global Q level for those other non-key frames, the bit rate controller selects the global Q level for the frame immediately following a key frame based on the global Q level for the frame immediately preceding the key frame. After resetting the global Q level to the value for frame i-2, processing ends.

If the previous frame is not a key frame (step 102), then the bit rate controller determines whether the current frame is adjustable (step 106). In a preferred embodiment of the present invention, the video encoder supports the concept of an adjustment interval. The adjustment interval dictates how often the global Q level can be changed in the sequence of video frames being encoded. For example, if the adjustment interval is set to 3, then the global Q level is allowed to be adjusted only every third frame (other than key frames). The bit rate controller preferably determines whether the current frame number is an integer multiple of the adjustment interval (e.g., if (frame# mod adjustment_interval==0)) in order to determine whether adjustment of global Q level for the current is permitted. If the adjustment interval is set to 1, then the bit rate controller will be permitted to adjust the global Q level for each frame, if necessary. Other schemes can be devised to designate other sequences of frames as adjustable frames. For example, to designate two out of every three frames as adjustable, the bit rate controller could specify a frame as adjustable if the frame number were not an integer multiple of the specified interval, where the interval is set to 3. In any case, if the current frame is not an adjustable frame, then processing ends.

Otherwise, the current frame i is an adjustable frame and the bit rate controller compares the size of the previous encoded frame (i.e., the number of bits used to encode the previous frame i-1) with a specified target encoded frame size (step 108). The target encoded frame size may be a static value based, for example, on the total memory allocated for the current sequence. Alternatively, the target encoded frame size man be dynamically set by the video encoder based on other considerations.

If the previous encoded frame size is less than the target encoded frame size, then the bit rate controller compares the difference between the target encoded frame size and the previous encoded frame size to a specified threshold (step 110). If that difference is larger than the threshold, then a quantization delta parameter is set to -1 (step 112). If the difference is not larger than the threshold, then Q delta is left at its initial value of 0.

If the previous encoded frame size is not less than the target encoded frame size (step 108), then the bit rate controller compares the difference between the previous encoded frame size and the target encoded frame size to a specified threshold (step 114). In a preferred embodiment, the threshold used in step 114 is the same as the threshold used in step 110, although that need not be the case. If the difference is greater than the thresholds then Q delta is set to +1 (step 116). If the difference is not larger than the threshold, then Q delta is left at its initial value of 0.

Those skilled in the art will understand that the processing of steps 108–116 are an example adjusting an encoding parameter (i.e., quantization level) based on a short-term characterization of the performance of the video encoder (i.e., comparing the size of the previous encoded frame to a specified target encoded frame size). If the previous encoded frame is too large, then the quantization level is increased for the current frame to attempt to reduce the number of bits used in encoding the current frame. If, however, the previous encoded frame is too small, then the Q level is decreased for the current frame to allow the current frame to be encoded using a larger number of bits.

After the adjustment of Q level based on the short-term characterization of steps 108–116 is implemented, processing continues to step 118 for adjustment of Q level based on a longer-term characterization of the performance of the video encoder. The bit rate controller compares a current average encoded frame size value to a target average encoded frame size (step 118). In a preferred embodiment, the target average encoded frame size is the same as the target encoded frame size used in steps 108, 110, and 114, although that need not be the case.

Similarly, in a preferred embodiment, the current average encoded frame size used in step 118 is the average of the actual encoded frame sizes for a specified number of frames preceding the current frame (e.g., 15 frames). Alternatively, the current average encoded frame size may be generated in other ways. For example, the current average encoded frame size $A_i$ could be generated using a filter according to Equation (1) as follows:

$$A_i = [(n-1)A_{i-1} + F_{i-1}]/n, \qquad (1)$$

where $A_{i-1}$ is the average encoded frame size for the previous frame, $F_{i-1}$ is the size of the previous encoded frame, and n is a specified number. In either case, the calculation of the current average encoded frame size preferably takes into account the encoding of key frames.

If the current average encoded frame size is larger than the specified target average encoded frame size (step 118), then the long-term trend in the performance of the video encoder is such that the encoded frames are too large. In this case, Q delta is incremented (step 120) to increase the quantization level and thereby tend to decrease the average size of the encoded frames.

Those skilled in the art will understand that one reason for using the adjustment interval of step 106 to prevent the global Q level from being allowed to be adjusted with every frame is to give the adjustment of Q level a chance (i.e., more than one frame) to have a meaningful effect on the long-term performance of the video encoder. If the global Q level is permitted to be changed with every frame, then, after the occurrence of a large encoded frame such as a key frame, the bit rate controller might increase the global Q level too drastically in the frames that follow the large encoded frame. By preventing adjustment of Q level with every frame, the video encoder has a chance to recover more gradually and with less impact to video quality from the large encoded frame over a longer period of time.

If the current average encoded frame size is not larger than the target average encoded frame size (step 118), then the long-term performance of the video encoder is acceptable and Q delta is not incremented. In any case, processing continues to step 122.

As mentioned earlier, key frames are encoded differently from other frames. Since key frames are used as the ultimate reference for subsequent predicted frames, the bit rate controller of the present invention allows key frames to be encoded using extra bits to provide higher quality. To achieve this higher quality, the bit rate controller allows the global Q level to be lowered for certain ranges of Q level. That is, if the current frame is a key frame (step 122), then the global Q level is decreased (step 124), preferably using the following formula:

if $Q \geq 6$, then $Q = Q - 2$ if $Q = 5$, then $Q = Q - 1$ if $Q \leq 4$, then $Q = Q$ In this way, frames that would otherwise be encoded using coarse quantization are encoded as key frames using finer quantization, while those frames that would be encoded using fine quantization are kept at their same level.

After the Q delta parameter has been set and possibly adjusted in steps 112, 116, and 120 and after the global Q level has been possibly adjusted in steps 104 or 124, the global Q level for the current frame is finally established in step 126 by adding Q delta to the current value for global Q level and ensuring that the new global Q level is within the legal range. For example, if there are 32 different quantization tables numbered 0 through 31, the new global Q level is clamped to that range. The video encoder then uses the global Q level generated by the bit rate controller to encode the current frame.

Figure 2:
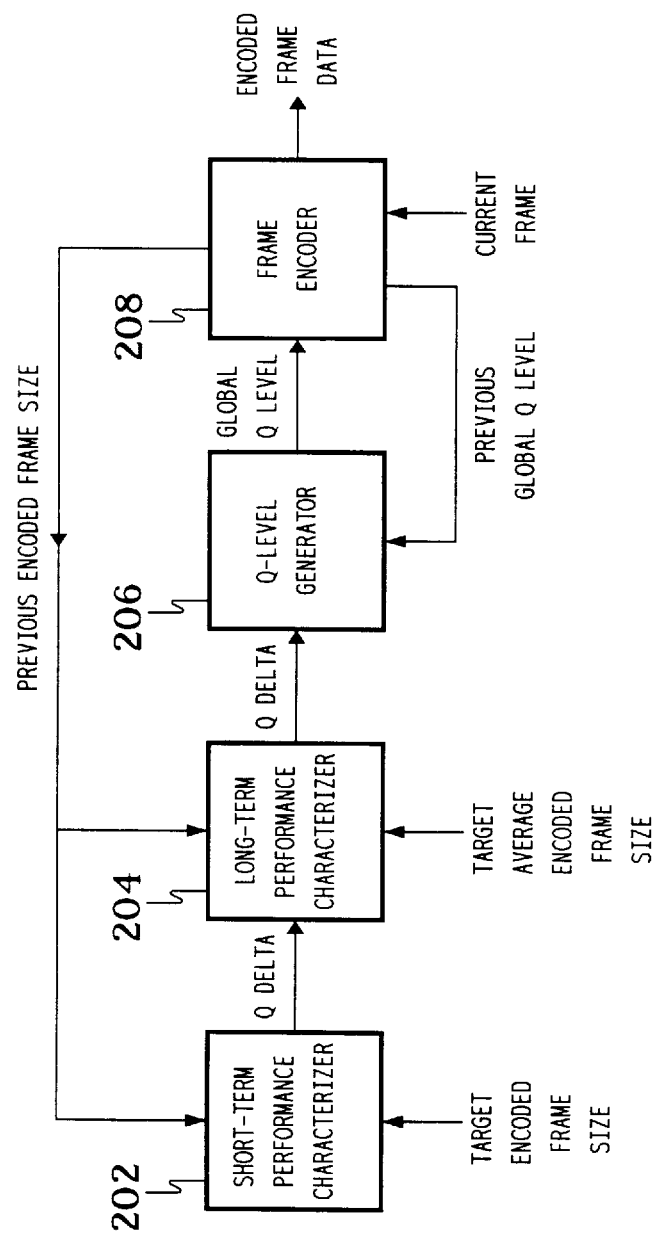
FIG. 2 is a block diagram of the bit rate controller of FIG. 1.

Referring now to FIG. 2, there is shown a block diagram of the bit rate controller of FIG. 1 when generating the global quantization level for adjustable, non-key frames, according to a preferred embodiment of the present invention. Short-term characterizer 202 characterizes the short-term performance of the video encoder based on the previous encoded frame size and the specified target encoded frame size to set the Q delta parameter. Long-term characterizer 204 characterizes the long-term performance of the video encoder using the previous encoded frame size (to update the current average encoded frame size) and the specified target average encoded frame size to adjust Q delta. Quantization-level generator 206 generates the global quantization level from the Q delta and the previous global Q level. Frame encoder 208 uses the global Q level to encode the current frame to generate the corresponding encoded frame data.

The present invention can be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be further understood that various changes in the details materials, and arrangements of the parts which have been described and illustrated in order to explain the nature of this invention may be made by those skilled in the art without departing from the principle and scope of the invention as expressed in the following claims.

What is claimed is:

1. A computer-implemented process for encoding video signals, comprising the steps of:
    (a) encoding a plurality of previous frames in a video sequence;
    (b) characterizing short-term performance of the encoding of the previous frames by comparing the size of a previous encoded frame i-1 with a target encoded frame size;
    (c) characterizing long-term performance of the encoding of the previous frames by comparing a current average encoded frame size with a target average encoded frame size;
    (d) generating a quantization level for a current frame i in the video sequence, said generating comprising the steps of:
        (1) adjusting the quantization level for coarser quantization, if the size of the previous encoded frame i-1 is greater than the target encoded frame size by a first threshold;
        (2) adjusting the quantization level for finer quantization, if the target encoded frame size is greater than the size of the previous encoded frame i-1 by a second threshold; and
        (3) adjusting the quantization level for coarser quantization, if the current average encoded frame size is greater than the target average encoded frame size by a third threshold; and (e) encoding the current frame based on the generated quantization level.

2. The process of claim 1, wherein the previous frames and the current frame are encoded in real time during capture of the video sequence.

3. The process of claim 1, wherein the characterization of the long-term performance of step (c) considers effects of encoding more of the previous frames than the characterization of the short-term performance.

4. The process of claim 1, wherein the generating of step (d) is based on the characterization of the short-term performance and on the characterization of the long-term performance for the previous frames.

5. The process of claim 1, wherein:

step (a) comprises the further step of determining whether the current frame is an adjustable frame;

steps (b) and (c) are implemented only if the current frame is an adjustable frame; and step (d) comprises the step of setting the quantization level for the current frame i equal to the quantization level for the previous frame i-1 if the current frame is not an adjustable frame.

6. The process of claim 1, wherein:

the first threshold is equal to the second threshold;

the current average encoded frame size is an average size of a specified number of previous encoded frames;

the target encoded frame size is equal to the target average encoded frame size; and the third threshold is zero.

7. The process of claim 1, wherein the quantization level is adjusted for finer quantization, if the current frame is a key frame.

8. The process of claim 1, wherein the quantization level is reset to the quantization level of the second previous frame i-2, if the previous frame i-1 is a key frame.

9. An apparatus for encoding video signals, comprising:

(a) means for encoding a plurality of previous frames in a video sequence;

(b) means for characterizing short-term performance of the encoding of the previous frames by comparing the size of a previous encoded frame i-1 with a target encoded frame size;

(c) means for characterizing long-term performance of the encoding of the previous frames by comparing a current average encoded frame size with a target average encoded frame size;

(d) means for generating a quantization level for a current frame i in the video sequence, said means for generating comprising:

(1) means for adjusting the quantization level for coarser quantization, if the size of the previous encoded frame i-1 is greater than the target encoded frame size by a first threshold;

(2) means for adjusting the quantization level for finer quantization, if the target encoded frame size is greater than the size of the previous encoded frame i-1 by a second threshold; and (3) means for adjusting the quantization level for coarser quantization, if the current average encoded frame size is greater than the target average encoded frame size by a third threshold; and (e) means for encoding the current frame based on the generated quantization level.

10. The apparatus of claim 9, wherein the previous frames and the current frame are encoded in real time during capture of the video sequence.

11. The apparatus of claim 9, wherein the characterization of the long-term performance of means (c) considers effects of encoding more of the previous frames than the characterization of the short-term performance.

12. The apparatus of claim 9, wherein the generating of means (d) is based on the characterization of the short-term performance and on the characterization of the long-term performance for the previous frames.

13. The apparatus of claim 9, wherein:

means (a) determines whether the current frame is an adjustable frame;

the processing of means (b) and (c) is implemented only if the current frame is an adjustable frame; and means (d) sets the quantization level for the current frame i equal to the quantization level for the previous frame i-1 if the current frame is not an adjustable frame.

14. The apparatus of claim 9, wherein:

the first threshold is equal to the second threshold;

the current average encoded frame size is an average size of a specified number of previous encoded frames;

the target encoded frame size is equal to the target average encoded frame size; and the third threshold is zero.

15. The apparatus of claim 9, wherein the quantization level is adjusted for finer quantization, if the current frame is a key frame.

16. The apparatus of claim 9, wherein the quantization level is reset to the quantization level of the second previous frame i-2, if the previous frame i-1 is a key frame.

17. A storage medium having stored thereon a plurality of instructions for encoding video signals, wherein the plurality of instructions, when executed by a processor, cause the processor to perform the steps of:

(a) encoding a plurality of previous frames in a video sequence;

(b) characterizing short-term performance of the encoding of the previous frames by comparing the size of a previous encoded frame i-1 with a target encoded frame size;

(c) characterizing long-term performance of the encoding of the previous frames by comparing a current average encoded frame size with a target average encoded frame size;

(d) generating a quantization level for a current frame i in the video sequence, said generating comprising the steps of:

(1) adjusting the quantization level for coarser quantization, if the size of the previous encoded frame i-1 is greater than the target encoded frame size by a first threshold;

(2) adjusting the quantization level for finer quantization, if the target encoded frame size is greater than the size of the previous encoded frame i-1 by a second threshold; and (3) adjusting the quantization level for coarser quantization, if the current average encoded frame size is greater than the target average encoded frame size by a third threshold; and (e) encoding the current frame based on the generated quantization level.

18. The storage medium of claim 17, wherein the previous frames and the current frame are encoded in real time during capture of the video sequence.

19. The storage medium of claim 17, wherein the characterization of the long-term performance of step (c) considers effects of encoding more of the previous frames than the characterization of the short-term performance.

20. The storage medium of claim 17, wherein the generating of means (d) is based on the characterization of the short-term performance and on the characterization of the long-term performance for the previous frames.

21. The storage medium of claim 17, wherein:

step (a) comprises the further step of determining whether the current frame is an adjustable frame;

steps (b) and (c) are implemented only if the current frame is an adjustable frame; and step (d) comprises the step of setting the quantization level for the current frame i equal to the quantization level for the previous frame i–1 if the current frame is not an adjustable frame.

22. The storage medium of claim 17, wherein:

the first threshold is equal to the second threshold;

the current average encoded frame size is an average size of a specified number of previous encoded frames;

the target encoded frame size is equal to the target average encoded frame size; and the third threshold is zero.

23. The storage medium of claim 17, wherein the quantization level is adjusted for finer quantization, if the current frame is a key frame.

24. The storage medium of claim 17, wherein the quantization level is reset to the quantization level of the second previous frame i–2, if the previous frame i–1 is a key frame.

* * * * *